Howard J. Murray
INVENTOR

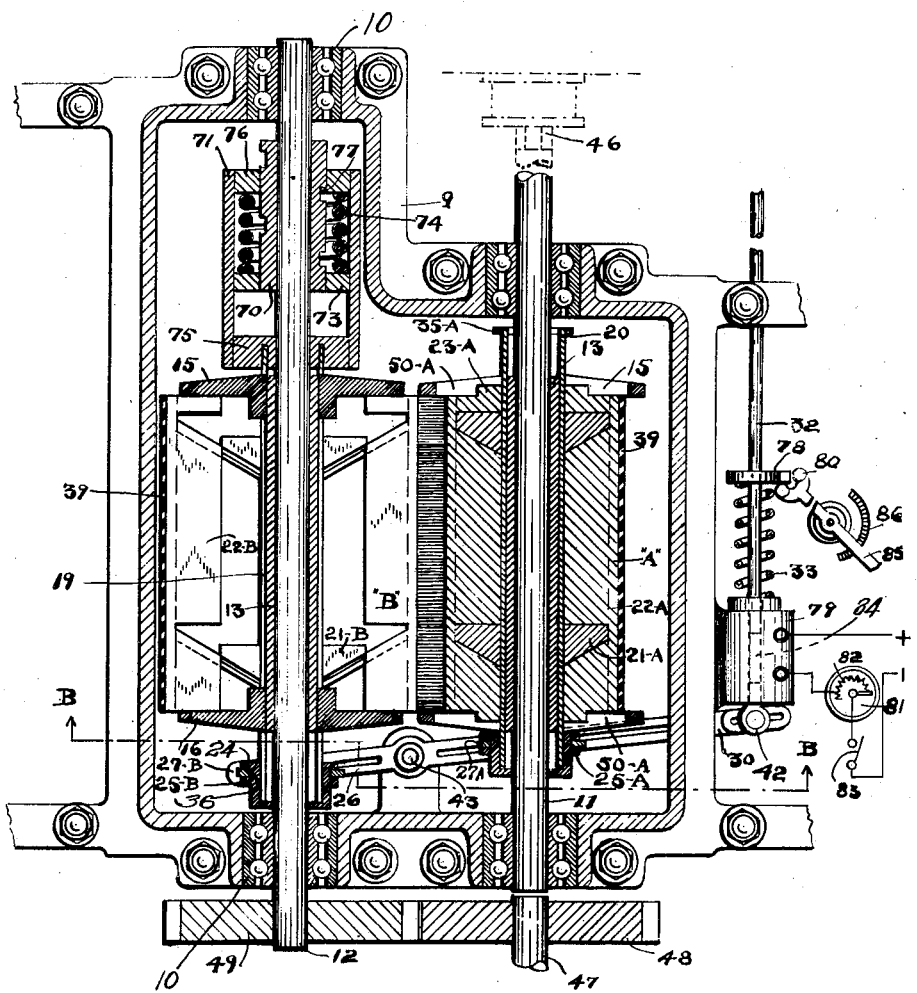

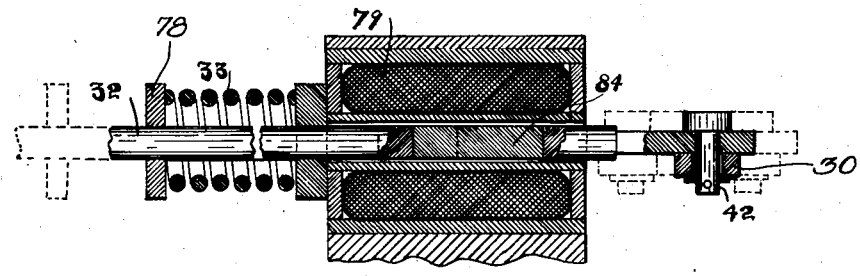
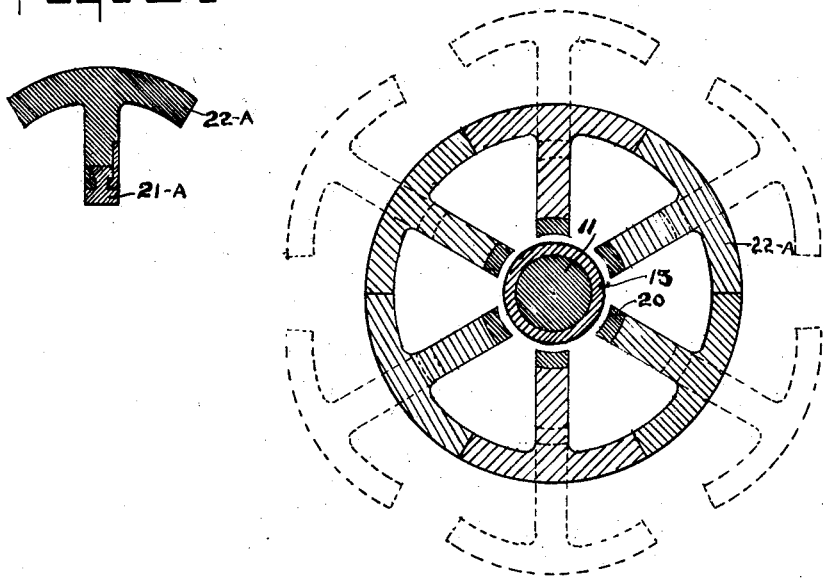

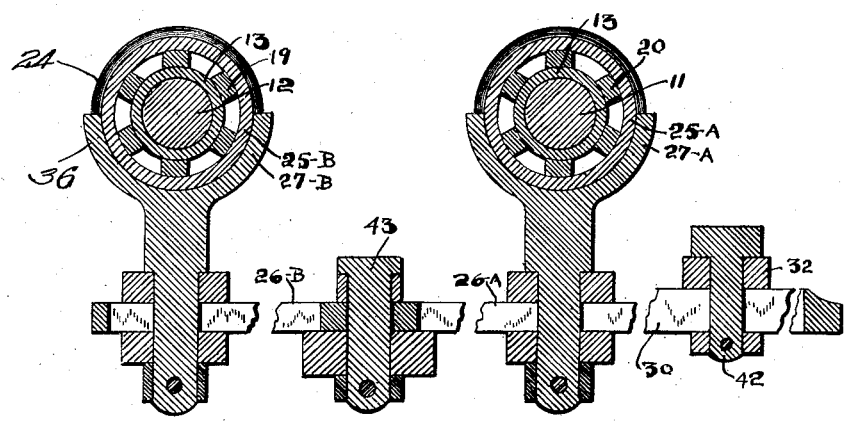

Patented Nov. 20, 1928.

1,692,091

UNITED STATES PATENT OFFICE.

HOWARD J. MURRAY, OF BROOKLYN, NEW YORK.

AUTOMATIC SPEED-CHANGING POWER TRANSMISSION DEVICE.

Refiled for abandoned application Serial No. 440,039, filed January 26, 1921. This application filed February 15, 1927. Serial No. 168,384.

My invention relates in general to a flexible variable speed transmission and automatic control mechanism and specifically relates to a device for manually or automatically maintaining desired speed and torque values from a constantly driven variable or constant speed power actuating member.

This application is refiled for the abandoned application #440,039 filed January 26, 1921.

One of the objects of my invention is to provide a simple form of flexible power transmitting device which will transmit power:

(a) at constant speed to the driven member, as said member is subjected to conditions of varying torque.

(b) at constant speed to the driven member, as said driven member is subjected to conditions of varying speed.

(c) automatically to a driven member at a desired variable speed-torque ratio, as the speed of the driving member is varied.

(d) automatically to a driven member at a desired variable speed-torque ratio, as the torque of the driving member is varied.

(e) to a driven member from a driving member, during which interval the speed-torque ratio may be varied manually, or automatically; or a combination of both.

(f) at constant speed to the driven member, when connected to a variable speed driving member.

(g) at constant torque to the driven member when connected to a variable torque driving member.

(h) and at the same time automatically function with the driving member so that constant speed and variable torque are imparted to the said driven member.

(i) and control the supply of power to the driving member so that variable speed at constant torque will be transmitted to the driven member.

(j) selectively by mechanical, electric or manual control means to secure different speeds and torque values from a driving power member.

(k) automatically by mechanical, electric or manual control means to secure different speeds and torque values on both said driving and driven members.

In one physical embodiment of my invention, I broadly attain the flexible transmission of power from a driving member to a driven member at constant speed or at constant torque by connecting two variable diameter power pulleys with a comparatively wide friction driving belt, and, in addition, causing or effecting a decrease in diameter of one pulley to force a relative increase in diameter of the other said pulley.

The invention also contemplates the use of a control, either electrical, mechanical or manual, or a combination of all three, so that a given constant or desired speed on the driven or actuated member will be automatically maintained, or the speed may be automatically changed to another constant or desired speed. The said control may also be applied so as to maintain a constant torque on the driven member, or to automatically effect a change to another desired or required torque.

For the purpose of explaining a theory of action which is believed to underlie the principles of my invention, let it first be assumed that two variable diameter power pulleys are provided. These two pulleys are so designed and arranged that a plurality of slidable radial members are pushed radially outwardly or pulled radially inwardly by mechanical connection with slidable actuating strips forming collectively a so-called slotted tube, said slotted tube arranged concentric with and moving transversely and parallel to the axis of the said shaft of the said variable diameter pulley. Triangular actuating fins attached symmetrically to this so-called slidable actuating tube and fastened to the said actuating strips terminate in a grooved top actuator sliding surface, said actuating surface forming an angle with the axis of its co-acting pulley.

The said radial slidable members collectively forming the driving surface of the pulleys are guided in symmetrically positioned radial slots in concentrically positioned disc-shaped ends of the said power pulleys, and have a slidable actuated surface locking with the actuating slidable grooved surface of the triangular fins attached to the said actuating strips.

The said so-called concentric slidable tube formed by the said strips projects outside the said pulley through the said radial end slots and terminates in a grooved collar at one end, said grooved collar being suitable for receiving suitable forked sliding control fingers. Hence, if these said sliding forked fingers attached to or forming part of a pivoted control bar mounted on its center axis and pivoted are caused to move in relatively opposite directions about the said pivot, and if the said forked sliding control fingers run and exert pressure in the grooved collars of the said two power pulleys whose axes are parallel, then the diameter of one said pulley will be caused to increase as the other said pulley decreases, and vice-versa.

If the outside curved driving or actuating surfaces of the said slidable radial members of the said two variable pulleys collectively forming the outer periphery of each of the said pulleys are operatively connected by a frictional driving belt placed over said pulleys, either power pulley will move or rotate the other said power pulley by means of said frictional driving belt when sufficient power is applied to one of the said power pulleys.

Attached to one end of the so-called slotted tube on power pulley "B" is a collar arranged to receive the end of said slotted tube. This said collar is loosely mounted on and revolves about the driven shaft of pulley "B".

Fastened to this collar is a hollow driving tube. A second collar having slotted fingers is fastened to the opposite end of the driving tube. This second collar revolves about and slides along a spirally grooved tube rigidly fixed to the driven shaft, and the spiral groove of this said tube is arranged to receive the fingers of the said sliding collar.

On the opposite end of the spirally slotted tube is fixed a stop collar. A spiral spring is mounted on the spirally slotted tube arranged so that its spiral runs opposite to the spiral of the said slot.

In further description and in the annexed claims, one power pulley will be called the driving or actuating member, and the other power pulley will be called the driven or actuated member.

If we still further consider that the centrally pivoted moving control arm or bar carrying the forked sliding control fingers is held positioned by a manually, mechanically or electrically adjustable control spring, also further consider that said adjustable control spring is designed to normally hold both said slotted sliding tubes on said variable diameter pulleys so that the respective driving diameters of the curved driving surfaces of the said slidable radial members are normally equal, then the said control spring will tend to maintain or affect the said power pulleys so that a 1:1 diameter ratio will be maintained.

However, it is evident that the said variable diameter pulleys may be so designed and arranged that any desired speed-torque ratio may be the normally maintained ratio.

However, if the driving surfaces of both said pulleys are of the same diameter the resultant forces will be neutralized. This is true because the resultant force will be transmitted first to the actuating fins, then to the slotted slidable tube and finally from the grooved collar on said tube or element to the forked sliding fingers riding in the slot of the said rotating collar. As the forked control fingers are symmetrically positioned about the said pivot on the pivoted control arm, and as the actuating forces against the said control fingers are equal and opposite, it is evident that the control arm force on one pulley equals the control arm force on the other pulley.

If the pivoted control arm is locked or held in a predetermined position then it is evident that the variable diameter pulleys may be caused to assume a fixed uneven diameter and maintain definite speed-torque ratios and accordingly transmit power from one pulley to the other.

It then follows that by changing the position of the said control arm one power pulley is accordingly increased in diameter as the other pulley is relatively or otherwise decreased. If the said pivoted control arm is mechanically or electrically locked or held at different predetermined or desired displacements, it is evident that as a result different speed-torque ratios will be established and maintained between the two said power pulleys.

If the said control arm, in addition, automatically affects and controls the supply of power to the driving or actuating power pulley, then the speed and torque ratio of the device as a unit is maintained at a predetermined value.

This is possible because the said pivoted control arm will be affected as hereinbefore described by the action of the said power pulleys to reach an equalized or neutralized position. This action will then determine the resultant neutralized position of the control arm. If the control of the supply of power to the driving or actuating member is connected to the said pivoted control arm, then the said source of power will be automatically affected by the movement of the control arm.

Hence it should be apparent that when the pivoted control bar or arm is locked in any desired position except the "neutral" or 1:1 ratio position, the respective torques of the said pulleys will not be equal and the pulley of the smaller diameter will tend to enlarge while the pulley of the greater diameter will tend to proportionally or relatively decrease according to a desired constant or varying inverse ratio.

For the purpose of further explanation, we will now consider the power pulley of the smaller diameter the driving or actuating member and the power pulley of the larger diameter the driven or actuating member.

It is still further assumed that the said frictional driving or actuating belt remains at approximately the same length, any possible variation in tension or length may be provided for by an idler pulley under proper tension.

It is also assumed that the movement of any portion of the device toward the top of the drawing is a movement to the left, and that any movement in the opposite direction is a movement to the right.

In the case of the frictional belt, the application of the device to transmission of power on moving vehicles allows the use of a very wide belt, and the actual friction surface used may be many times more than that required in order to eliminate loss of power due to slippage.

Returning again to the description, we have the so-called tube of the smaller diameter or driving pulley pushing by means of its groove collar against the forked sliding-control fingers and thence by means of the centrally pivoted control bar and the opposite forked fingers against the surface of the groove of the collar of the driven pulley. The collar due to this pressure accordingly re-acts or pushes against the slidable tube and thence against the actuating fins of the driven pulley. Finally, the radial actuating fins of the driven pulley are as a result of this pressure tending to move transversely, say, to the left, in which case the radial members would move radially inward and collectively decrease the periphery and, hence, the actuating surface diameter of the driven or actuated pulley.

But the centrally pivoted control bar is, for the purpose of description, assumed to be locked or held when in its given or desired position and, hence, the movement described above cannot take place, and power could be transmitted at this definite ratio.

However, if the control bar be unlocked and normally positioned with the said adjustable control springs so that the driven and driving members take the position formerly assumed when the bar was assumed to be locked, the following action or movement will occur.

As the load or torque on the driven or larger diameter surface is increased due to increase of the connected load the torque on the driven pulley shaft will be increased due to its larger diameter in greater proportion than the torque on the smaller diameter surface or driving pulley because of the difference in respective speeds. Hence, there will be a resultant of forces tending to bring the said pulleys to a 1:1 transmission ratio. This force will finally act against the control springs positioning the pivoted control rod and cause or affect the control rod to move with both collars so as to bring such a ratio condition about. The amount of change will, of course, depend on the strength or tension of the said control springs and the value of the power load or torque on the driven or actuated member.

This action may be explained as follows: When there is no driving tension on either the driving or the driven shafts the resultant position of the slotted tubes will be due to the combined forces of the control springs acting on the control arm. When torque is applied to driven shaft and thence as previously described to the slotted tube, of the driven pulley, we have this torque also imparted to the driving tube which is rigidly attached to the said slotted tube. But the driving tube also imparts the torque to the collar having fingers riding in the spiral slot of rigidly fixed collar.

The spiral is so arranged that the fingered collar when rotating clock-wise around the said spirally slotted tube will be moved to the right and against the tension of the torque control spring.

This motion to the right will continue until the force of the torque control spring acting against the slot by means of the fingers equals the resistance of the driven shaft of the "B" pulley and the effect of the variable control spring acting on the control arm.

As the resistance or torque of the driven shaft varies the position of the fingered collar will change due to its effect on the torque control spring. But this movement will actuate the slotted tube in either direction, and, in turn, the relative diameters of the pulleys due to the resultant movement of the control arm.

Hence, an increase of torque on the driven shaft will automatically increase the active diameter of the driven pulley and accordingly decrease the diameter of the driving pulley.

If the arrangement is reversed the reverse action would also take place.

Hence, the device will be able to maintain constant torque on the driven shaft or, with proper adjustment, constant speed may be obtained. And, in addition, the control bar spring may be caused to act with or against the tension of the torque control spring independently of the effect of the torque.

But any change in position of the control bar could be made to affect the supply of power to the prime mover assumed to be actuating the driving member. In this case the power supply could be automatically increased so as to maintain constant speed on the said driven member under condition of increasing or varying torque. A practical application would be the increase or variation of supply of gas to a gasoline engine on an automobile. Or the movement of the control arm could be made to decrease the supply of power as in the case of an overload or excessive torque tending to exceed the mechanical strength of the device.

Such an action of said control means would mean automatic regulation to give constant torque on the driven member with variable speed impressed on the driving member.

By mechanical, electric or manual control of the above said control spring, it is evident that the speed-torque ratio of the two said pulleys may be maintained, changed, or varied at will or automatically.

It is obvious that the control bar, spring and associated elements may be designed so that the said power pulleys may be caused to vary their effective driving surfaces. For example, the larger driving pulley may be changed to the smaller one when the torque conditions become changed and power is transmitted from the normally driven shaft to the normally driving shaft.

It is also evident that the movement of the control bar could automatically control the supply of power, such as the supply of gas to an automobile engine, under a number of desired operating conditions, such as a plurality of speed and torque ratios and, hence, different conditions of speed and torque of the driven members could be attained and maintained, either manually or automatically.

The invention is susceptible of numerous physical embodiments but only one type is herein illustrated for the purpose of showing an application of the invention, but it is to be understood that the showings in the drawings are largely diagrammatic, merely being sufficient in detail to show an application of the invention.

While the invention is obviously capable of use in any location where it is desired to receive power from a driving member, the invention is particularly applicable to an electrically, mechanically or manually controlled power transmission system designed for use in connection with automobile construction, and it is in connection with this particular use that the invention will be described in detail.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:

Figure 3 is a horizontal section, taken axially, showing the position of the parts in an operated position when one pulley is at a maximum diameter and the other pulley at a minimum diameter.

Figure 5 is a transverse sectional view showing the displacement and movement of the control bar and spring, and a control means.

Figures 6 to 8 are enlarged details of certain features shown in Figure 1, Figure 6 showing a section of the fins, Figure 7 the slotted cylinder or tube and the radial members in action, and Figure 8 the assembly of the collar and forked fingers.

Figure 1:
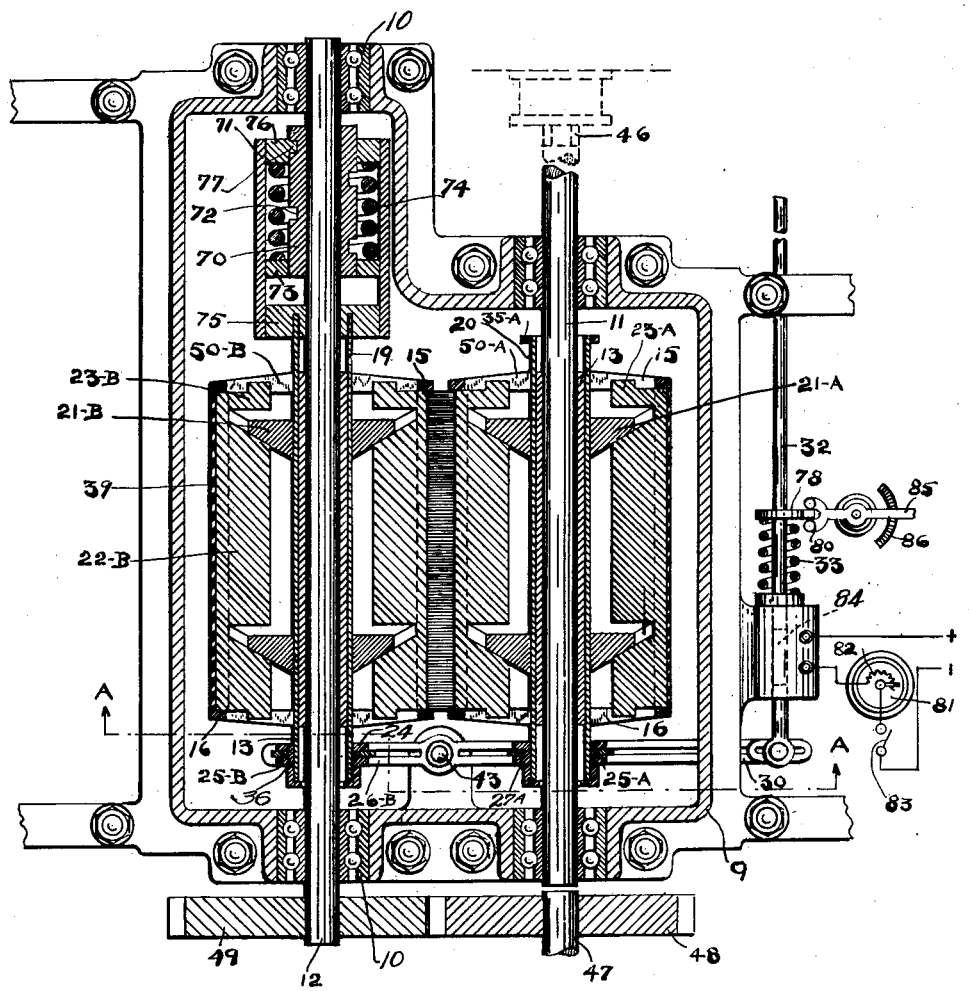
Figure 1 is a physical embodiment of my invention in horizontal section, taken axially of the main shafts and with co-acting parts shown in full and dash outline.
Figure 2:
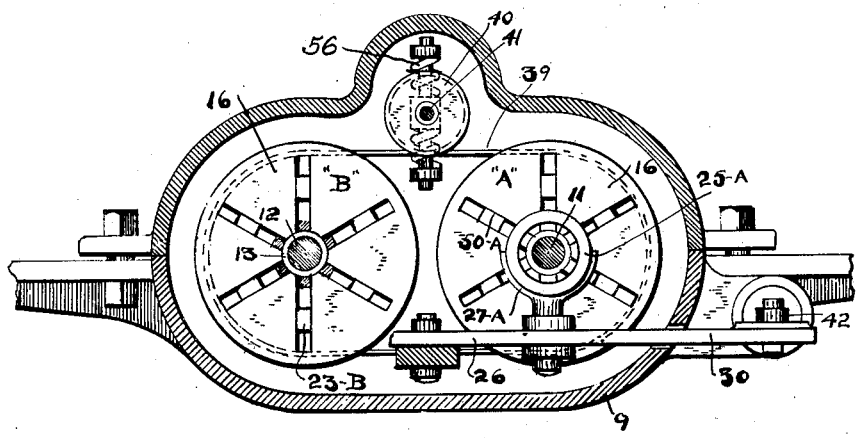
Figure 2 is a transverse sectional view taken approximately upon the line A—A of Figure 1, looking in the direction indicated by the arrow.
Figure 4:
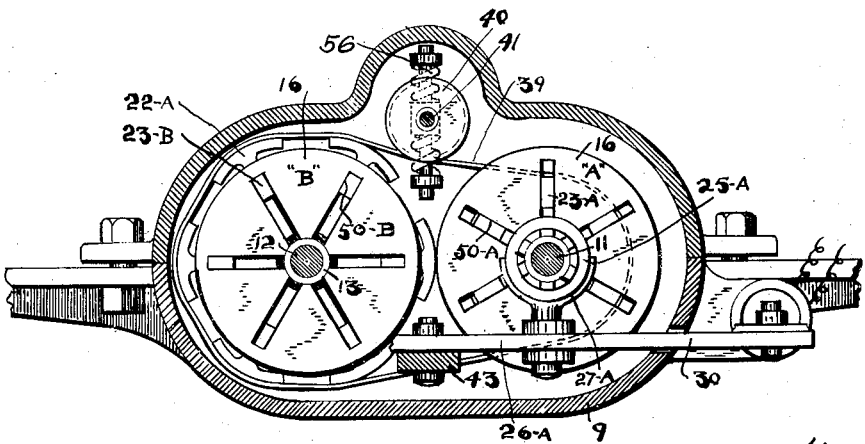
Figure 4 is a transverse sectional view taken approximately upon the line B—B of Figure 3, looking in the direction indicated by the arrow.

In the following description and in the annexed claims, parts will be identified by specific names for convenience of expression but they are intended to be as generic in their application to similar parts as the art will permit.

Used in connection with a self-propelled vehicle, the device may be mounted in any desirable location on the said vehicle and is enclosed in a suitable casing 9 designed to form the journal bearings and supports for the mechanisms carried thereby.

Further for the purpose of showing the applicability of this invention to an automobile engine construction, it will be considered that the shaft 11 is a power shaft operatively connected through the clutch 46 with the engine shaft of an automobile and that the shaft 47 is a propeller shaft operatively connected to propel or drive the traction wheels of the said automobile.

The propeller shaft 47 is mounted in alignment with the power shaft 11. A counter shaft 12 provided with the driven pulley "B" is rotatably mounted on the bearings 10 within the casing and parallels the encased portion of the propeller shaft 11. The gears 48 and 49 are constantly in mesh, so that the counter shaft 12, is constantly connected to drive the propeller shaft 47.

The features hereinafter described may be considered as an assembled operative unit adapted to be attached and adjusted to the conventional parts of a self-propelled vehicle hereinbefore described.

Mounted on the enclosed portion of the engine shaft 11 is a variable diameter power pulley "A". Tracing out the arrangement of this said pulley, it is noted that there is an element consisting of a tubular portion 13 ending in two similar parallel facing discs 15 and 16. The tubular portion 13 is adapted to be mounted for rigid transverse concentric slidable connection with the driving or actuating shaft 11.

The parallel concentric end discs are slotted out radially as at 50-A to allow the plurality of radial segmental members 22-A to move radially outward or radially inward with respect to the center line of the power shaft 11.

These radially moving members 22-A are positioned and guided by a shoulder portion 23-A designed to move in the slots 50-A.

The segmental members 22-A are actuated and controlled by the movement of triangular actuating fins 21-A attached to slidable strips 20, said slidable strips being movable transversely in both directions parallel to and concentric with the axis of the shaft 11.

The sliding surfaces of 21-A and 22-A are locked together as shown in Figure 6.

But the said actuating fins 21-A are secured to the strip 20 collectively, forming in effect, collectively, a tube concentric to the power shaft 11. Secured to the projecting portions of the strips 20 outside of the discs 15 or 16 at one end only is a grooved rotating collar 25-A designed to hold two slidable forked fingers 27-A, an enlarged section of which is shown in section in Figure 8. At the opposite end of the strips 20 is a ring 35-A designed to hold the strips 20 in place relative to the shaft 11.

The said forked fingers 27-A fitting and sliding in the slot of the collar 25-A are attached to a pivoted arm 26 suitably pivoted at 43.

Similarly positioned on the driven shaft 12 is a similar variable diameter power pulley parallel to the one just described. The driving or actuating pulley may be designated as the "A" pulley and the driven or actuated pulley as the "B" pulley. The respective parts are similarly identified and the description of the driving pulley will apply to the driven pulley.

The friction belt 39 is held in tension due to the tension pulley 40 running on the shaft 41, said shaft held under proper spring tension. The belt 39 is assumed to be sufficiently wide to allow for the proper transmission of power with a wide margin of reserve surface, and under proper tension.

Attached to the slidable members of the power pulley "B" is a collar 75 suitable for receiving the end of the slotted tube 19.

This collar 75 is loosely mounted on the shaft 12. Securely fastened to the collar 75 is a hollow driving tube or cylinder 71 to which is attached a second collar 76 having fingers. This second collar 76 is provided with fingers 77 and revolves about and slides along a spirally grooved tube 70, which is securely fastened to the driven shaft of "B". The spiral groove 72 of tube 70 is designed to receive the fingers 77 of collar 76.

On the opposite end of 70 is fitted a stop collar 73. A spiral compression spring 74 is positioned around 70 having collars 73 and 76 as limits.

In operation it may be assumed that the "clutch" 46 is "closed" or "in" so that the actuating engine is directly connected with the power shaft 11. When the shaft 11 is rotated the actuating pulley "A" and its parts will therefore be caused to rotate with it. The collar 25-A will also rotate and the forked fingers 27-A ride in its slot. As the moving vehicle propelled by the propeller shaft 47 starts to move, the torque on the said shaft is increased. This resistance is transmitted to the gears 48 and 49 and eventually to the pulley "B" and, of course, to the engine shaft 11 by means of the belt 39 and the pulley "A" (assumed for purposes of description).

In order to overcome this resistance and continue to move the vehicle at perhaps an increasing speed, the engine must deliver more power to the propeller shaft 47.

This power, omitting all frictional losses, is the product of speed and torque, and for any given value of this power either the torque or speed may be increased or decreased so long as the product is kept at a constant value.

Now one of the objects in view in the arrangement under consideration is to increase the speed of the engine with a corresponding decrease in torque of the driving shaft while the speed of the propeller or driven shaft 47 is decreased and its torque increased correspondingly. Or any combination of increasing, maintaining or decreasing the speed or torque of the engine and propeller shafts is possible by this arrangement.

We will first consider the case where the torque is increasing on shaft 47 with the engine shaft 11 rotating at constant speed and torque.

As the torque on 47 increases it is evident that a similar or equal increase of torque will take place in the shaft 12 of power pulley "B". But cylinder 70 rigidly attached to shaft 12 will offer a resistance to the rotating fingers 77 of collar 76 energized by collar 75 by means of driving tube 71.

Before the driving fingers 77 can cause cylinder 70 to transmit torque to shaft 12 sufficient to overcome its resistance or the torque of the connected load, there must be a resultant of force against the wall of slot 72 due to the pressure of fingers 77 to overcome the said torque.

Hence, 76 will travel to the right along 70 and thereby compress the spring 74. This compression will continue until the desired pressure of finger 77 against the wall of the said slot 72 takes place. This desired pressure is that pressure necessary to overcome the resistance of the connected load.

But the movement of collar 76 to the right also moves the actuating fins 21-B to the right and accordingly moves the segmental members 22-B radially outward and thereby increases the driving diameter of the power pulley "B".

The movement of collar 76 is also given to the collar 24 by means of the strips 19. But the said force due to the torque on shaft 12 when transferred on the collar 24 is, in turn, imparted to the forked fingers 36 and, hence, to the opposite end of the control bar arm 26. As the said control bar 26 is pivoted at 43, an equal and oppositely disposed force will be imparted to the collar 25-A due to the pressure from the forked fingers 27-A, thereby decreasing the diameter of pulley "A".

If the control bar 26 is actuated, in addition, by the control rod 32, as shown as Figure 1, moving, say, to the left, assuming the pulleys "A" and "B" to be equal in diameter before such action takes place, then the diameter of "A" is further decreased and the diameter of "B" is further increased. This at once gives a speed ratio between "A" and "B" varying from 1:1 and, at the same time, further increases the torque of shaft 12 over that of shaft 11. This means that the co-acting force due to the increased torque of 12 when impressed on the collar 24 acting on the arm 26-B is added to the decreased force of collar 25 acting on arm 26-A round the pivot 43. The natural resultant then would be that the extension control arm 30 would further re-act by means of joint 42 and arm 32 against the control spring 33. The extent of this movement tending to affect the relative speeds of the pulley "A" and "B" will depend on the tension and adjustment of the said control spring 33 and 74.

The spring 33 may be further affected by energizing the magnet 79 by varying the resistance 82 at control station 81 after switch 83 has been closed. The magnet will then exert a pull on the plunger 84, and the control rod 32 will be moved to the left against the force of spring 33, or the hand lever 85 may be locked in any of the steps 86 and thereby hold the fixed collar 78 due to fingers 80 at any desired position. This will position the control rod 32 so that the spring 33 will have no effect on the control arm 26.

In other words, the device would automatically vary the relative diameters of the driving and driven pulleys to secure constant speed or constant torque on the driven shaft 12.

Hence, any desired ratio of speed and torque condition on either driving or driven shaft could be caused or effected by automatic or manual adjustment of the control springs 33 and 74.

When the driving shaft 11 rotates at the same speed as driven shaft 47 the actuating engine may be considered as driving on a 1:1 ratio, or direct drive to the propeller shaft.

We will now return to the condition of increasing torque on the driven shaft, and assume that the condition of maximum torque has been reached.

The engine speed may have or have not been increased, but the engine will be driving the propeller shaft at a ratio represented by the gears 48 and 49 and the diameter ratio of pulleys "A" and "B".

With a decrease in resistance of the connected load, the torque on 12 may be decreased and, consequently, the resultant force necessary for the finger 77 to drive 70 will decrease or the collar 76 will move to the left and, by reversing the action of the device, as previously explained, the pulley will decrease in driving diameter and pulley "A" will relatively increase.

Hence, the arrangement provides means whereby a self-propelled vehicle may be started from a state of rest by throwing in the "clutch", and then have said arrangement automatically adjust itself to connect the actuating engine to the driving wheels with a wide range of suitable speed and torque ratios.

Also, the arrangement automatically changes the speed ratio between the driving and driven member according to the torque imposed on the driven member and, in addition, this ratio may also be affected by the manual or automatic action of the control rod 32 coacting with control spring 33. This action of 32 may be caused manually or it may be a function of the movement of the power pulleys "A" and "B", or "A" or "B".

It should also be obvious that if the control rod 32 had been displaced to the extreme right then the speed ratios of "A" and "B" would be relatively reversed, that is, the frictional driving diameter of power pulley "A" will be greater than the driving diameter of pulley "B". If we also reverse the action of the fins 21-A and 21-B then an increase of torque on the driven member as 47 could be made to relatively increase the speed on the said driven member or the load would automatically limit the possible maximum speed of the driven vehicle. The gears 48 and 49 are shown of equal size on Figure 3 and, hence, in this case an increase of torque on shaft 47 would tend to bring shafts 47 and 11 to the same speed value as the fins 21-A and 21-B will tend to come at rest when at the same driving diameter.

Returning again to the condition where an increase of torque on the driven member 47 results in a decrease of speed in the same member, it is assumed that the engine shaft 11 is running at full speed.

However, the invention contemplates a coacting connection between the control rod 32, control spring 33, and the normally manual control of the actuating engine shown in dotted lines of Figure 5, and therefore includes an arrangement whereby the torque on the driven member automatically controls the supply of fuel to or power of the said prime mover or actuating engine, and thus varies the speed and torque of same. This arrangement, of course, allows the condition of a movable vehicle being driven at constant speed whether upgrade or on the level.

It should now be obvious that the control rod 32 may be locked in steps, as shown on Figure 5, so as to get definite speed ratios and then employ the use of a spring or tension means, such as 33, to allow or cause variations from this definite speed when the control rod 32 is not locked. This means that such an arrangement would operate to result in a shock absorbing means and would thereby protect tires, gears, bearings, etc., as a sudden increase in torque would result in a quick movement of the control bar 26 about the pivot 43 and, consequently, a movement of the collar 78 against the control spring 33.

It should also be noted that a high torque would automatically be provided for starting, which would properly decrease as speed was attained.

The rod 32 may be controlled by manual, mechanical or electrical means, or a combination of all three.

It should be noted also that an arrangement may be adjusted to offset any predetermined or expected operating torque, so that the arrangement may also become a safety device.

The power pulleys "A" and "B" may be made relatively very wide so that sufficient driving surface may be available for imparting power to the driving belt 39. There will be a slight change in the total necessary length of belt as the diameters of the pulleys change from a minimum to a maximum but a properly designed spring 56 holding the shaft 41 of the tension pulley 40 should maintain the belt 39 in a proper tension to transmit power from one of said power pulleys to the other.

It is obvious that by means of a device of this character a nicety of automatic action can be provided which is so arranged that the pulleys may be affected to obtain combinations of speed and torque without shock, noise, or injury to any of the parts.

As the actuation may be independent of human efforts, the time interval of control and its effect can be made definite and standard action secured.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination of a pair of power transmitting pulleys mounted for rotary movement and connected to a source of power, frictional means for transmitting power from one to the other, means for increasing or decreasing the operating diameters of the said pulleys, said pulleys including a plurality of segmental parts, an actuating means for collectively moving the said segmental parts, a resilient control means for positioning and moving the said actuating means, mechanism for varying the tension of the resilient means proportional to the resistance of the connected load on the driven pulley, means for varying the supply of power to the driving pulley proportional to the said resistance, and electrical means for opposing or assisting the said resilient control means, said electric control means to be manually varied.

2. In a device of the class described, the combination of a pair of power pulleys mounted for rotary movement and operatively connected one to the other by a driving frictional surface, one of which said pulleys is adapted to allow its driving segmental surfaces to increase its driving diameter as the driving diameter of the segmental surfaces as a whole on the other pulley is decreased, actuating means actuated by the torque of the driven pulley for effecting the said changes in diameter, a control means for limiting the movement of the said actuating means, resilient means for placing the said control means under tension, and magnetic means for varying the said tension, and a manually operated control station for energizing the electric means.

3. In a device of the class described, the combination of a pair of power transmitting pulleys, mounted for rotary movement, means consisting of radially moving segmental parts arranged for decreasing and increasing the operating diameter of the said pulleys, an actuating means for radially moving the segmental parts collectively forming the said operating diameter, a control means for positioning and moving said actuating means, resilient means for placing said control means under tension, and mechanism for varying the tension of the said resilient means, and for permitting the said actuating means to move the said segmental parts.

4. In a device of the class described, the combination of a pair of pulleys permanently in operative connection, an element of a clutch operatively connected to each one of the said pulleys to revolve therewith, co-acting clutch elements adapted to be in continual engagement with the pulley clutch elements, a pivoted arm connecting said pulley clutch elements, a shiftable control means for actuating the said pivoted arm, and electric means for placing the said control means under tension.

5. In a device of the class described, the combination of a pair of pulleys permanently in operative connection, an element of a clutch operatively connected to each one of the said pulleys to revolve therewith, co-acting clutch elements adapted to be in continual engagement with the pulley clutch elements, a pivoted arm connecting said pulley clutch elements, a shiftable control means for actuating the said pivoted arm, resilient means for placing the said control means under tension, and an electromagnet for controlling said control means.

6. In a device of the class described, the combination of a pair of pulleys permanently in operative connection, an element of a clutch operatively connected to each one of the said pulleys to revolve therewith, co-acting clutch elements adapted to be in continual engagement with the pulley clutch elements, a pivoted arm connecting said pulley clutch elements, a shiftable control means for actuating the said pivoted arm, and resilient means for placing the said control means under tension, and an electromagnet for controlling said control means operable at any speed of the driven member for energizing said electromagnet.

7. In a device of the class described, the combination of a driven and a driving member, an element of a clutch operatively connected to each of said members to revolve therewith, a co-acting clutch element adapted to be continually in engagement with the revolving clutch element, an actuating bar rigidly connecting the said co-acting clutch elements to electrically control the diameter of the said driven and driving members thereby, a manual control means for varying the action of the said electrical control means to affect said actuating means to control same.

8. In a device of the class described, the combination of a pair of power transmitting pulleys mounted for rotary movement and connected to a source of power, frictional means for transmitting the said power from one pulley to the other, means for increasing or decreasing the operating diameters of the said pulleys consisting of a plurality of segmental parts movable radially, reciprocating fins for moving said segmental parts, a rotating collar adapted to reciprocate the said fins, and an element consisting of a pivoted control bar connected to the collars of the said pulleys to co-act therewith, means also attached to and actuating the said fins consisting of a spirally slotted cylinder fixed to the driven shaft, a fingered collar attached to said fins, said fingers adapted to ride in said slot and a contained spring for pressing the said fingers against the wall of the said slot, means acting with or against the tension of the said contained spring to also actuate the said fins independent of the said contained spring, and control means for varying the last named means.

9. In a device of the class described, the combination of a pair of power pulleys mounted for rotary movement and operatively connected with a driving belt, one of which is adapted to have its driving surface decrease in diameter as the diameter of the other pulley is increased, torque actuated means for effecting the said change in diameter, a control means for controlling the action of the said actuating means, resilient means for placing the said control means under tension, and electromechanical means for varying the said tension.

10. In a device of the class described, the combination of a pair of power members having segmental driving surfaces permanently in operating connection, an element consisting of a pivoted control bar connected to both of the said power members to co-act therewith to automatically change the driving surfaces of the said power members, torque controlled resilient means actuated by one of the said power members thereby to actuate the said bar, magnetic means designed to co-act with the said torque control means to additionally actuate the said control bar, and means varied by the said torque control resilient means to vary the the power imparted to the said members.

11. In a device of the class described, the combination with a pair of driving power pulleys adapted to revolve each other by means of a friction belt, and a manual control means for varying the relative driving surfaces of the said driving members so that one surface area increases approximately as the other pulley surface area decreases, and a control bar positioned between the said pulleys and designed to effect the said variation, and power control means actuated by the said control bar to desirably affect the amount of power imparted to the said pulleys.

12. In a device of the class described, combination of a power transmitting device consisting of a driving and a driven member mounted on separate shafts for rotary movement, means for varying the effective driving diameters of the said power members so that the said diameters are varied in proportion to the speed and torque imposed on the shafts of the said members, torque control means designed to vary the diameter of one pulley whereby it is decreased in proportion as the diameter of the other pulley is increased, resilient means for actuating the said varying means, electrically controlled means for additionally varying the effect of the said resilient means, and means operatively associated with the said electric means thereby to vary the power imparted to the said driving member.

13. In a device of the class described, the combination of a power transmitting device consisting of a driving member and a driven member mounted for rotary movement, automatically actuated means designed to vary the diameters of the said power members proportional to the rotational resistance offered to the said driven member, electrical means operatively associated with the said automatically actuated means to co-act therewith to additionally affect the diameters of the said power members, manually actuated selective means designed to maintain the said diameters in a fixed relation independently of the said automatic and electrical means, and a control station for causing the said electric means to become selectively energized.

14. In a device of the class described, the combination of a power transmitting device consisting of a driving member and a driven member mounted for rotary movement, automatically actuated means designed to vary the diameters of the said power members proportional to the rotational resistance offered to the said driven member, electrical means operatively associated with the said automatically actuated means to co-act therewith to additionally affect the diameters of the said power members, manually actuated selective locking means designed to vary the extent of the said electric means in its cooperative association with the said automatically actuated means, and a control station for causing the said electric means to become selectively energized.

Signed at New York in the county of New York and State of New York this 11th day of February, A. D. 1927.

HOWARD J. MURRAY.